Figure 1:
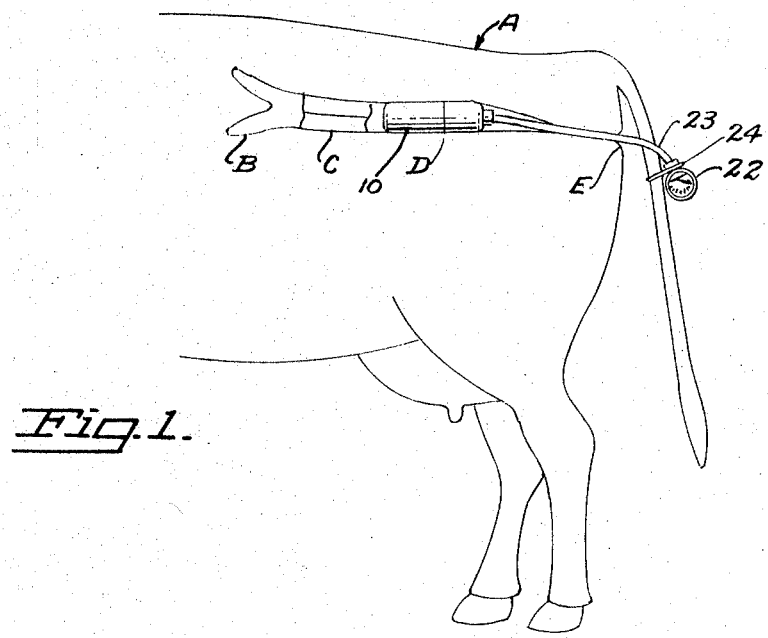

Jan. 10, 1967  E. MATHIESEN  3,297,020
APPARATUS FOR DETECTING ESTRUS IN ANIMALS
Filed Sept. 30, 1963

INVENTOR.
ERIK MATHIESEN
BY J. E. Trabucco
ATTORNEY

United States Patent Office 3,297,020
Patented Jan. 10, 1967

3,297,020
APPARATUS FOR DETECTING ESTRUS IN ANIMALS
Erik Mathiesen, P.O. Box 881, Petaluma, Calif. 94952
Filed Sept. 30, 1963, Ser. No. 312,458
2 Claims. (Cl. 128—2)

This invention relates to apparatus for detecting estrus in animals.

The recurrent, restricted period of sexual receptivity in female animals, marked by certain physiological changes, is known as "estrus" or "heat." During the estrus period, a physiological change occurs in the genital tract of the female animal due to ovarian hormonal activity, and by actually detecting such a change, either artificial or natural insemination can be successfully carried out.

At the present time, the common methods of estrus detection in cattle are the visual observation of a cow's behavior, observation of the excretion from the vaginal tract through the vulva, observation of the behavior of other cattle toward the cow, and the use of certain devices attached externally to a cow to indicate unusual behavior in such cow.

Estrus in cows is accompanied by the unusually rapid secretion of mucous in the vaginal canal, and in accordance with the principles of the present invention the detection of such increased mucous flow will accurately determine when the estrus period of the cow has commenced and when artificial insemination can be expected to be successful.

The present invention in its broad aspect contemplates the insertion in the vaginal canal of a cow of a suitable device or combination of devices which are responsive to the increased flow of mucous to actuate a complementary, externally arranged visual indicator. The preferred embodiment of my invention includes a suitably shaped carrier for insertion in a cow's vaginal canal, having a pair of exposed electrodes connected in a circuit supplied with an electrical current by a battery, and an amplifier connected to the electrodes and also connected by suitable conductors leading to an electrically operated indicator arranged externally of the vaginal tract, the two (2) electrodes when simultaneously in contact with the mucous in the vaginal tract closing the circuit to actuate the indicator.

The primary object of my invention is to provide improved apparatus of the kind characterized having means adapted to be inserted in the vaginal canal of an animal which is responsive to the increased flow of mucous in the vaginal canal and which is connected to and associated with an externally arranged visible indicator capable of reacting in accordance with the means.

Other and further objects of this invention will be indicated in the appended claims or will be obvious to one skilled in the art upon an understanding of the present disclosure. For the purpose of this application, I have elected to show herein certain forms and details of apparatus for detecting estrus in animals which is representative of my invention; it is to be understood, however, that the embodiment of my invention herein shown and described is for purposes of illustration only and that therefore it is not to be regarded as exhaustive of the variations of the invention in the art.

Figure 2:
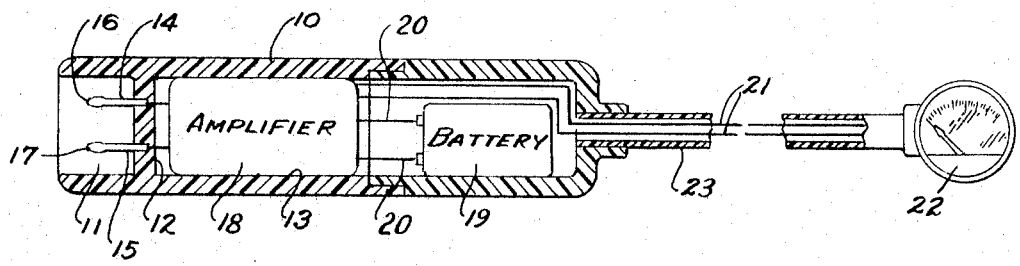

Referring to the drawing:

FIG. 1 shows apparatus embodying my invention operatively positioned with respect to a cow; and FIG. 2 is an enlarged side elevational view, partly in section, showing my invention.

Shown on the drawing is the rear end portion of a cow A, showing diagrammatically its internal organs comprising the uterus B, cervix C, vagina D and vulva E. During estrus, or heat periods, the secretion of mucous from the membranes of the vagina and cervix into the vagina increases, due to certain physiological changes in the cow.

My invention includes an elongated casing 10 of somewhat cylindrical form having an open compartment 11 in its forward end which is separated by a partition 12 from a closed compartment 13. The casing 10 is adapted to be inserted into the cow's vagina D, wherein it preferably occupies a position with its open compartment 11 facing the uterus B. The open compartment 11 is positioned to receive mucous secreted into the vagina when the cow is in heat. Mounted in the open compartment 11 on the forward ends of rigid electrical conductors 14 and 15, respectively, are electrodes 16 and 17, which are suitably positioned to come into contact simultaneously with the mucous partially filling such compartment. The electrodes may be made from various metals such as silver, platinum, gold, graphite and stainless steel. The conductors 14 and 15 extend rearwardly through the partition 12 and into the closed compartment where they connect with a suitable amplifier 18 positioned in such compartment. The amplifier is electrically connected to a small battery 19 by conductors 20, 20. The amplifier is electrically connected by suitably insulated wires 21, 21 to a remotely positioned device such as a milliameter 22 for visually showing the output from such amplifier. The wires 21, 21, which are encased in a suitable insulating covering (not shown) are enclosed in an elongated, flexible tube 23 connected to the casing 10, such tube extending outwardly from the cow's vagina through its vulva. So as to support the milliameter 22 in a position where it may be easily seen, and to hold the casing 10 and its contents in suitable positions in the vagina, the tube 23 is fastened to the cow's tail, as by a cord 24 or a strip of tape.

Thus it will be noted that the electrical circuit, supplied with an electrical current by the battery 19, will be closed when the mucous in the open compartment 11 sufficiently fills the latter to bridge the space between the electrodes to connect the latter electrically. The rather weak electrical current, being amplified by the amplifier 18, will flow to and through the milliameter 22 to energize the same and thereby visibly indicate the presence in the cow's vagina of a more than ordinary amount of mucous, a physiological condition indicating the cow is in heat.

It is to be understood that means other than the one shown and described herein may be utilized to indicate visually an increase in the secretion of mucous into the cow's vagina, this being possible since there are numerous types of indicators capable of being energized or activated by an electrical current generated in the apparatus.

What I claim is:

1. In apparatus for detecting estrus in animals, a casing insertable into the vagina of an animal and having an open compartment for receiving mucous secretions from the vagina, a pair of electrodes positioned in the compartment in spaced relation to each other and connected in an electrical circuit to be closed by the mucous secretions filling the open compartment sufficiently to contact the electrodes simultaneously, means to supply an electrical current to the circuit, and means electrically connected in the circuit to indicate visibly the closing of the circuit.

2. In apparatus for detecting estrus in animals, a casing insertable into the vagina of an animal and having an open compartment to receive mucous secretions from the vagina during periods when the animal is in heat, a pair of electrodes positioned in the compartment in spaced relation to each other, the said electrodes being connected in an electrical circuit to be closed by the mucus secretions filling the compartment sufficiently to contact the electrodes simultaneously, means contained in the casing to supply an electrical current to the circuit, an amplifier contained in the casing and connected in the circuit to amplify the current, and means connected in the electrial circuit to indicate visually the closing of the circuit.

References Cited by the Examiner

UNITED STATES PATENTS

| | | |
|---|---|---|
| 1,518,211 | 12/1924 | Maue. |
| 2,012,112 | 8/1935 | States _____ 128—2 X |
| 3,076,431 | 2/1963 | Rule et al. _____ 119—1 |

RICHARD A. GAUDET, *Primary Examiner.*

SIMON BRODER, *Examiner.*